United States Patent [19]

Drouet et al.

[11] Patent Number: 4,912,736
[45] Date of Patent: Mar. 27, 1990

[54] X-RAY TOMOGRAPHIC DETECTOR

[75] Inventors: Martine Drouet, Pierrefitte; Jean-Paul Bonnefoy; Henri Guers, both of Grenoble; Gaëtan Pleyber, Domene, all of France

[73] Assignee: Commissariat a l'Energie Atomique, Paris, France

[21] Appl. No.: 301,061

[22] Filed: Jan. 25, 1989

[30] Foreign Application Priority Data

Jan. 26, 1988 [FR] France .................. 8800855

[51] Int. Cl.4 ........................................... G01N 23/08
[52] U.S. Cl. .................................................. 378/19
[58] Field of Search ............... 378/19; 250/374, 385.1

[56] References Cited

U.S. PATENT DOCUMENTS

| | | | |
|---|---|---|---|
| 4,047,039 | 9/1977 | Houston | 250/385.1 |
| 4,149,109 | 4/1979 | Krentz et al. | 250/374 |
| 4,217,498 | 8/1980 | Racz et al. | 378/19 |
| 4,297,576 | 10/1981 | Laval et al. | 378/19 |
| 4,431,921 | 2/1984 | Filthuth | 250/374 |
| 4,481,420 | 11/1984 | Allemand et al. | 250/385.1 |
| 4,535,245 | 8/1985 | Zonneweld et al. | 250/374 |

FOREIGN PATENT DOCUMENTS 0012065 6/1980 European Pat. Off. .
0064913 11/1982 European Pat. Off. .

Primary Examiner—Janice A. Howell
Assistant Examiner—John C. Freeman
Attorney, Agent, or Firm—Oblon, Spivak, McClelland, Maier & Neustadt

[57] ABSTRACT

The invention concerns an X-ray tomographic detector. This detector comprises a sealed chamber (4) containing a gas able to be ionized by X-rays having traversed a device or an object. This chamber comprises on a front face an X-ray inlet gate (5) and contains an X-ray detection unit (11). Connections means (27, 28, 29, 32, 33) traversing a rear face of the chamber (9) to link the detection means to measuring (14) and feed (15, 16) means outside the chamber. The detection means comprise electrodes (19) and a polarization plate (18) separated by an insulating brace (3) transparent to X-rays. According to the invention, this brace has the shape of frame. This frame rests firstly on the polarization plate (18) and secondly on conductive strips (22, 24) brought to the same potential reference (16) as that of the electrodes.

Application for X-ray tomography.

6 Claims, 2 Drawing Sheets

X-RAY TOMOGRAPHIC DETECTOR

FIELD OF THE INVENTION

The present invention concerns an X-ray tomographic detector.

BACKGROUND OF THE INVENTION

It applies to the detection of X-rays having traversed a device or an object according to a predetermined cutting plane; the detector supplies signals which are, for example, processed by a computer to obtain the image of the cutting of this device or this object. Of course, the detector of the invention can be used in radiography, which is a simplified form of tomography.

The method is known on how to obtain an image of a cutting of a device or an object by means of a tomographic device by transmitting towards this device or object an incident X-ray plane beam, this beam having a wide angular aperture and not having a large thickness. The tomographic detector which is used in this apparatus makes it possible to measure the absorption of X-rays traversing the device or object, this absorption being linked to the density of the tissues of the examined device or to the density of the materials constituting the examined object.

After a suitable digital processing, a multiplicity of scannings in crosswise directions makes it possible to know the signals collected on the detection cells of the detector, the value of absorption of the X-rays at each point of the cutting plane in question, and also the density of the tissues of the device or density of the materials constituting the object. A knowledge of the different values of this density enables the cutting image of the device or object to be restored.

There currently exist an X-ray tomographic detector with a simple structure, but this is not perfect. This detector comprises a sealed chamber containing a gas able to be ionized by incident rays originating from the device or object and, inside the sealed chamber, a polarization plate. This plate is parallel to the beam plane of the incident rays and is brought, for example, to a positive high voltage. A set of load collection electrodes, of the same sign as that of polarization of the plate and resulting from ionization of the gas by the X-rays originating from the object, is disposed opposite said plate. These load collection electrodes (or measuring electrodes), which are flat and elongated, are brought to a potential similar to a reference potential. These electrodes are carried by an insulating substrate and are orientated towards an input gate of the chamber receiving the incident X-rays coming from the object or the device. Each measuring electrode, together with the part opposite the polarization plate, defines an elementary cell of the detector. Each electrode supplies a testing current proportional to the amount of loads obtained by ionization of the gas opposite this electrode under the effect of the rays derived from the object or device. The testing currents are measured by measuring means connected to the electrodes.

In this known type of detector, the polarization plate is fed by an electric voltage source outside the chamber; and the means for measuring currents circulating inside the electrodes are themselves outside the chamber. Thus, connection means are provided which traverse the sealed chamber so as to allow the plate to be fed and the electrode currents to be measured. These connection means may be of the two following types:

connecting wires linking respectively the electrodes and the plate to connection terminals isolated from the chamber and situated on a back face of the latter opposite the gate. These connection terminals or binders are then linked by means of other connecting wires to the power supply and the measuring means;

connecting wires connecting the plate and each of the electrodes respectively to supply and measuring lines embedded in an insulated flexible strip opening inside the chamber between the bottom of the latter and a cover which seals it.

So as to keep a permanent gap between the polarization plate and the substrate which supports the measuring electrodes, means are known for inserting between this plate and the substrate an open-worked insulation brace for passage of the gas having the form of a frame and which slightly absorbs the X-rays.

This known type of detector has many drawbacks. The main drawback results from the fact that the passage of the X-rays inside the insulated brace ionizes the material constituting the brace. Consequently, in the absence of any special precaution, electric charges accumulate inside this material and on its surface and flow through the electrodes towards the measuring means where they appear as strays. These strays are not constant and locally depend on the intensity of the X-rays received and the electrical characteristics of the insulated material constituting the brace. This material, which is usually made of epoxy glass, exhibits a viscosity phenomenon of relatively high duration incompatible with the scrutinizing period of the measurement channels. Moreover, the detection unit partially occupies the chamber and thus there exists dead volumes between the volume occupied by the detection unit and the internal volume of the chamber inside which there is an electric field between the polarization plate and the connecting wires. The configuration of this field is not clearly defined. Consequently, stray electric loads flow into the dead volumes of the chamber and generate eddy current which adversely affect the quality of the tomographic image it is desired to obtain. This stray load detection in fact induces apparent variations of sensitivity of the detection cells; in the images obtained after processing of the testing currents supplied by the cells, these variations are expressed by artifacts which spoil the quality of the image.

Moreover, the electric loads, which may accumulate on the surface of the insulated material constituting the brace, induce a modification of distribution of the potential lines of the electric field in the detection cells; as a result, there may be a risk of disruptive discharge occurring between the measurement electrodes and the polarization plate.

Another drawback results from the accumulation of current loads, especially on the surface or inside the brace insulating material; this accumulation modifies perpendicularity of the electric field with respect to the electrodes and uncontrollably develops the collection rate of loads created in the gas.

Finally, a further drawback of this known type of detector results from connecting the plate to electric power supply external means and from connecting the electrodes to external measurement means. These connections, which require the use of connecting wires connected to the binders or to an antenna of conductors opening onto the back surface of the chamber, is difficult to embody. Moreover, these conducting wires are distributed inside the chamber, this distribution being difficult to control.

SUMMARY OF THE INVENTION

The object of the invention is to overcome these drawbacks and more particularly to produce an X-ray tomographic detector which, by means of its conductive strips on which rests the insulating brace close to the measurement electrodes, avoids interference due to eddy current loads which accumulate inside this brace or on its surface; these conductive strips form a guard ring brought to a potential similar to that of the measurement electrodes. This detector also allows for simplification of the connection means which more particularly connect the internal electrodes and plate inside the chamber to the measurement means and the power supply source outside the chamber; these connection means are embodied in the form of tracks printed on the substrate which supports the electrodes; preferably, these electrodes are themselves printed on this substrate; the tracks open onto the rear face of the chamber through an insulating passage able to be easily embodied.

The object of the invention is to produce an X-ray tomographic detector suitable for detecting incident X-rays having traversed a device or an object and forming a plane beam of small thickness, comprising at least one sealed chamber filled with at least one gas able to be ionized by the incident X-rays passing through an inlet gate extending onto a front face of this chamber, the internal part of the chamber being partially occupied, between its front face and a rear face opposite the front face, by means of a detection unit having a front face opposite the gate and a rear face opposite the rear face of the chamber and, between the rear face of the detection unit and the rear face of the chamber, means traversing the rear face of the chamber in order to connect the detection unit with measurement means and power supply outside the chamber, the detection unit comprising at least one detection stack including a polarization conductive plate parallel to the incident beam plane and connected by the connection means to a voltage source, a measurement electrode unit delimited by a first and last electrode both collecting the loads resulting from ionization of the gas by the X-rays, these electrodes being formed of conductive strips orientated towards the gate and disposed on an insulating substrate plane parallel to the beam plane and being respectively connected by the connection means to means for measuring the currents circulating inside the electrodes on account of collection of the loads, and an electrically insulating brace to separate the polarization plate and the electrodes and so as to keep parallel this plate and the substrate, wherein the insulating brace has the form of a frame having two parallel opposing rear faces, the plate resting on the first face of said two rear faces, the second support face resting on a first conductive strip disposed on the substrate at right angles to the electrodes opposite the gate and along the latter, as well as along the first and last electrodes of said unit, the second support face resting on a second conductive strip which rests on the insulating strip superimposed at right angles to the electrodes close to the rear face of the detection unit, the first and second conductive strips and the measurement means being linked by connection means to a reference potential.

According to one particular characteristic of the invention, the first conductive strip is printed onto the substrate, the second conductive strip being printed on the insulating strip.

According to another characteristic of the invention, the connection means of the electrodes of the first and second conductive strips and the plate comprise tracks printed on the substrate and respectively connected to said electrodes, the first and second conductive strips and to the plate, this substrate and these tracks traversing at least one opening of the rear face of the chamber through an output connection fixed around the substrate and the tracks and fixed to the rear face of the chamber, these tracks being respectively connected outside the chamber to said measurement and power supply means, and to the reference potential.

According to another characteristic of the invention, the output connection comprises an adaptor sleeve comprising an opening for the passage of tracks and the substrate which are secured inside this opening by an insulating sealing glue, the adaptor sleeve being engaged in the opening of the rear face of the chamber and comprising a shoulder equipped with fixing means on the rear face of the chamber, a seal joint being inserted between this shoulder and the rear face of the chamber.

According to a particular characteristic, the first and second conductive strips are in contact.

According to another particular characteristic, the first and second conductive strips are interconnected.

BRIEF DESCRIPTION OF THE DRAWINGS

The characteristics and advantages of the invention will be more readily understood from reading the following description with reference to the annexed drawings in which.

DETAILED DESCRIPTION OF THE PREFERRED EMBODIMENTS

Figure 1:
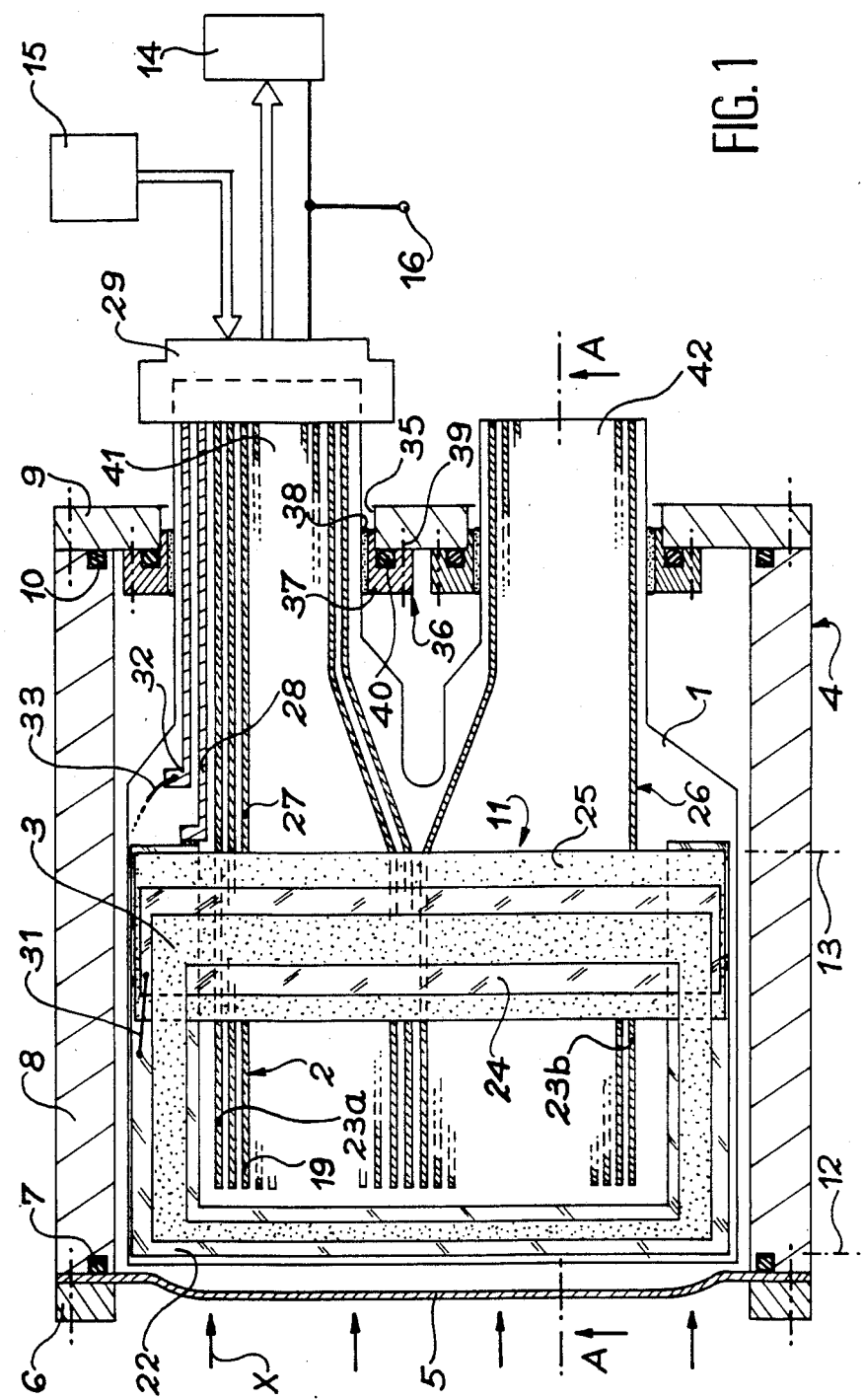
FIG. 1 is a diagrammatical view of a detector according to the invention, this cutting being embodied in a plane parallel to the incident rays between the polarization plate and the measurement electrodes.

FIG. 1 diagrammatically represents a cross section of an X-ray tomographic detector according to the invention. The cut realized here in in a plane parallel to the plane of the beam of incident X-rays between the plane of an insulating substrate 1 supporting a measurement electrode unit 2 and a polarization plate plane, which shall be described fully later, and which is parallel to the incident X-rays plane. The polarization plate and the insulating substrate are separated by an electrically insulated brace 3 and which absorbs a small quantity of X-rays.

The detector represented on this figure essentially comprises a sealed chamber 4 filled with at least one gas able to be ionized by the incident X-rays. one front face of this chamber comprises an incident radiations input gate. This input gate is constituted by an opening on a front face of the chamber closed by a thin membrane 5 slightly absorbing the incident X-rays. The opening is sealed by the membrane 5 by means of a flange 6 and an O-ring joint 7 situated, for example, inside the body 8 of the chamber. The flange 6 is of course fitted with means, not shown on this figure, for securing it to the body 8 of the chamber 4. The rear face of the chamber is sealed by a cover 9. Sealing between the cover 9 and the chamber body is, for example, ensured by an O-ring joint 10, the cover being made integral with the body 8 of the chamber by fixing means not represented on this figure.

The internal part of the chamber 4 between the front face 5 and the rear face 9 of this chamber is partially occupied by a detection unit 11 including in particular the electrode set 2 and the polarization plate, not shown on this figure. This detection unit has a front face 12 opposite the gate 5 and a rear face 13 opposite the rear face 9 of the chamber. The internal part of the chamber 4 is also occupied between the rear face 13 of the detection unit 11 and the rear face 9 of the chamber by means to be subsequently described in full; these means traverse the rear face of the chamber and allow for the connection of the detection unit 11 with the measurement means 14, together with the power supply means constituted by the voltage source 15 and with a reference potential 16 outside the chamber.

Figure 2:
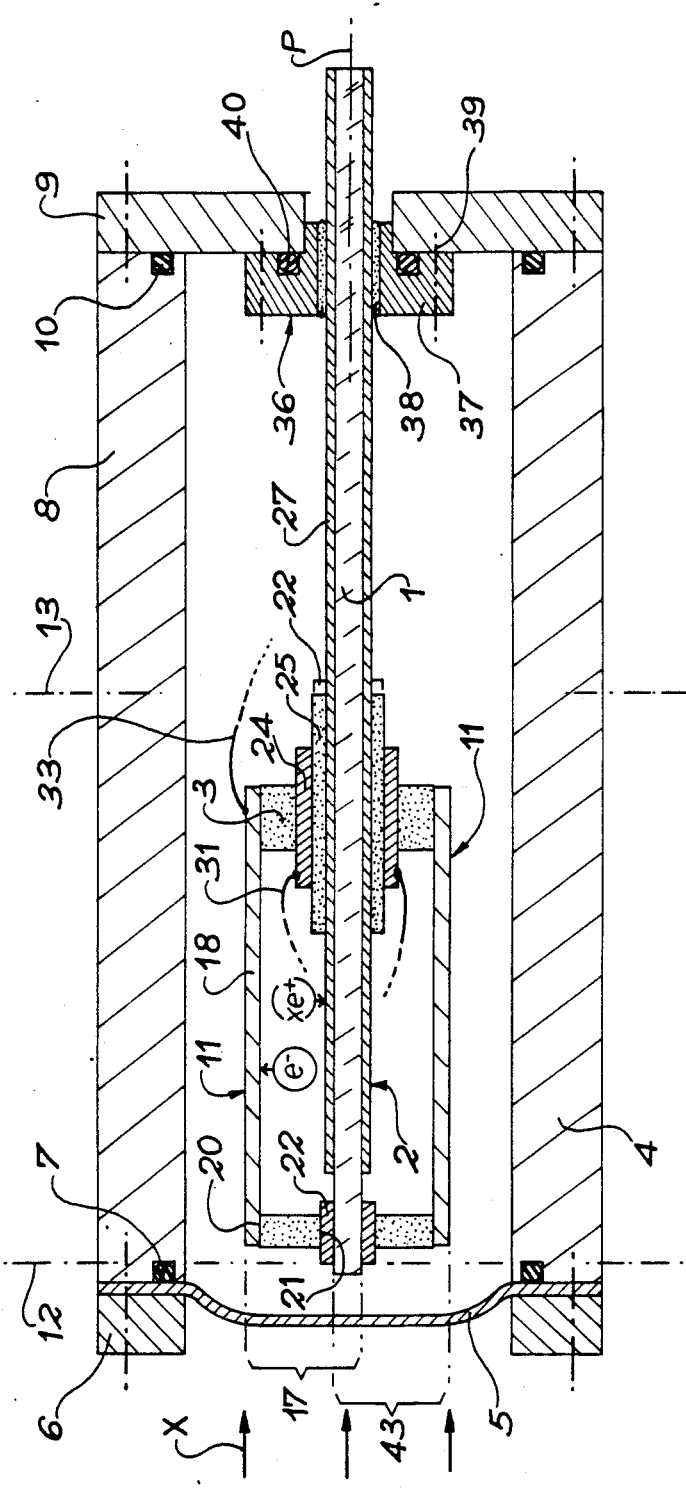
FIG. 2 is a side projection sectional drawing of the detector of FIG. 1 along the axis AA.

FIG. 2, which diagrammatically shows a cross section AA of the detector of the invention and viewed together with FIG. 1, enables the structure of this detector to be better understood. The same elements bear the same references on this figure and on FIG. 1.

The detection unit 11 comprises at least one stack 17 which comprises the polarization plate 18 parallel to the the X-ray incident beam plane P. The incident beam, which on the figure exhibits a relatively small thickness, is actually extremely thin; thus, the beam is considered to be contained in the plane P. The polarization plate 18 is linked by connection means, which shall be fully described subsequently, to the voltage electric source 15; this electric source, for example, supplies a positive d.c. voltage ($+HV$). During ionization of the gas under the effect of incident X-rays penetrating inside the chamber 4, the plate 18 brought to a potential ($+HT$) of several KV collects minus charges, such as the electrons ($e^-$); the load measurement or collecting electrodes 2 allow for positive loads, such as ions, to be collected. They are respectively linked to the connection means, which shall be subsequently described in detail, by means of measurement 14 means fed by means not shown here. These electrodes are brought by the collected loads and by the measurement means to a potential similar to the reference potential. Obviously, if the plate were brought to a negative potential, it would collect positive charges, whereas the electrodes would collect minus charges. The electrodes are carried by the insulating material plane substrate 1 (epoxy glass for example) and are electrically insulated from each other. If the gas filling the internal part of the chamber 4 is, for example, xenon, it has a pressure of between 10 to 20 bars, ionization of the xenons producing ($e^-$) electrons attracted by the place 13 and the ions $Xe+$ attracted towards the electrodes.

The collection of positive charges by the electrodes produces the circulation of a current in the latter. It is this current which is measured by the aforesaid means 14. The values of the currents thus measured for each electrode are supplied to processing means, not shown on this figure, to obtain the image of the cutting of the object or device inside the plane P.

The electrodes 2 are formed from conductive strips 19 orientated towards the gate 5. These strips are for example copper strips printed on the insulating substrate 1 parallel to the beam plane P. The insulating substrate and the electrodes 2 are separated from the polarization plate 18 by the electrically insulated brace 3 which absorbs a very small quantity of X-rays. This brace makes it possible to keep parallel the plate 18 and the substrate 1.

According to the invention, the insulating brace 3 has the shape of a frame (FIG. 1) having two parallel and opposing support faces 20, 21, (FIG. 2). The polarization plate 18 rests on the first face 20 of the brace. The second face 21 serves as a support for a first conductive strip 22; this strip is disposed on the substrate 1 extending at right angles with respect to the electrodes 2 opposite the gate 5 and along the first electrode 23a and the last electrode 23b of the electrodes unit 2. The second face 21 of the brace 3 supports a second conductive strip 24 which rests on an insulating strip 25 superimposed to the electrodes unit 2 extending at right angles with respect to these electrodes close to the rear face 13 of the detection unit 11. The face 21 of the insulating brace 3 exhibits, close to the conductive strip 24 and the insulating strip 25, a light offsetting with respect to this face close to the conductive strip 22 corresponding approximately to the thickness of the strip 25.

The first and second conductive strips 22, 24, are linked, as shall be subsequently seen, by connection means to the reference potential 16. This reference potential 16 is also connected to measurement means and corresponds to the electric ground of these means. In this way, the potential applied to these conductive strips is similar to that applied to the measurement electrodes of the unit 2.

As shown in FIG. 1, the first conductive strip 22 is for example a copper strip, which is printed on the substrate 1. The second conductive strip 24 may also be a copper strip printed on the insulating strip 25.

The connection means of the electrodes 2 and the first and second strips of the plate 18 comprise a set of tracks 26, such as the track 27, printed on the insulating substrate 1. These strips may for example be copper strips printed on this substrate. These strips are respectively connected permanently to the electrodes of the unit 2 and to the first and second conductive strips 22, 24. The strip 28 is thus connected to the conductive strip 22. These various strips make is possible, by means of the connector 29 constituted in a known way and not described in detail here, to connect the electrodes to the measurement means 14 and to connect the conductive strips to the reference potential 16. Of course, this conductor is situated inside the chamber 4. The electric linking between the conductive strip 24 and the conductive strip 22 is ensured either by direct contact between these two strips, or by a connecting wire 31 linking these two strips. The plate 18, which must be fed by the voltage supplied by the source 15, is connected to this source by the track 32, itself being linked to the plate 18 by a connecting wire 33. The various tracks 27, 28, 32, traverse at least one opening 35 of the rear face, constituted by the cover 9 sealing the chamber 4, through an output connection such as 36. This connection is secured around the substrate 1 and the tracks 26; it is also secured onto the cover 9. These tracks are connected as indicated above by the connector 29 to the measurement means 14, to the power supply source 15 and to the reference potential 16.

The output connection 36 comprises an adaptor sleeve 37. This adaptor sleeve comprises an opening allowing for passage of the tracks and the substrate 1. These tracks are secured inside this opening by an impervious and insulating glue 38. This adaptor sleeve is engaged into the opening 35 of the rear face 9 of the chamber 4 and includes a shoulder fitted with means 30 (not shown on this figure) to secure it to the rear face 9 of the chamber. A seal joint 40 is inserted between the shoulder and the rear face of the chamber.

In the example of the embodiment shown on this figure, the insulating substrate 1 is subdivided into two parts 41, 42 each being engaged inside an output connection identical to the connection 36. In particular, this subdivision allows for the smaller dimension 29 to be used and also a better distribution of the tracks on the substrate 1. The connector, the measurement and power supply means, as well as the potential reference, have not been shown on FIG. 2.

Another detection stack 43 is shown by way of example on FIG. 2. This stack is identical and symmetrical to the stack 17 with respect to the substrate plane. Other stacks of the same type could be mounted inside the chamber 4. Interconnections between the output tracks of these different stacks could be embodied in a known manner by means of connecting pions. One detector exhibiting a large number of stacks of the same type as the one previously described may make it possible to carry out a standard multicutting tomography.

The invention easily enables the aims previously described to be attained: the connections of the electrodes with the measurement means and the connection of the plate with the power supply source, which are ensured by the tracks already described, are very simple; this type of connection avoids the presence of connecting wires inside the chamber and which, as indicated previously, generate disturbing electric fields. The passage of these tracks inside the chamber rear face via the connection using an adaptor sleeve is very simple and in particular makes it possible to keep in place the detection stack inside the chamber in association with other means not shown on the figures. The tracks embodied in the form of integrated circuits are much more reliable than wire linkings, as no welding is required. The first and second conductive strips on which the brace rests create a guard ring whose potential is similar to that of the measurement electrodes and thus eliminates the appearance of parasitic charges. Finally, as the chamber 4 and adaptor sleeve 37 are advantageously conductors, the output connection formed by this adaptor sleeve 37 acts also as a guard ring around the output tracks. The chamber acts as a Faraday cage. In fact, the chamber and adaptor sleeve are brought to a potential similar to the potential of the electrodes.

What is claimed is:

1. An X-ray tomographic detector for detecting incident X-rays having traversed a device or an object and forming a thin beam plane P, said detector comprising at least one sealing chamber filled by at least one gas capable of being ionized by incident X-rays traversing an input gate extending onto a first front face of the chamber, an internal part of the chamber being partially occupied between said first front face and a first rear face opposite the first front face by a detection unit having a second front face opposite the gate and a second rear face opposite the first rear face of the chamber and, between the second rear face of the detection unit and the first rear face of the chamber, by means traversing the first rear face of the chamber in order to connect the detection unit to a measurement means and a power supply means outside the chamber, the detection unit comprising at least one detection stack which comprises a polarization conductive plate parallel to the incident beam plane P and linked by connection means to a voltage source, a measurement electrode unit delimited by a first and last electrode, said first and last electrodes collecting charges resulting from the gas ionization by the X-rays and being formed of conductive strips orientated towards the gate and distributed on an insulating substrate plate parallel to the beam plane P, said first and last electrodes being respectively linked by connection means to the measurement means, and an electrically insulated brace to separate the polarization plate and the first and last electrodes so as to keep parallel the polarization plate and the substrate plate, wherein the insulating brace has the shape of a frame having two opposite parallel faces, the polarization plate resting on a first of the two opposite parallel faces, a second support face of the two opposite parallel faces resting on a first conductive strip disposed on the substrate plate and positioned opposite the gate and at right angles to the first and last electrodes, the second support face resting on a second conductive strip, said second conducting strip resting on an insulating strip superimposed at right angles to the first and last electrodes the and positioned near rear face of the detection unit, the first and second conductive strips and the measurement means being linked by the connection means to a reference potential.

2. Detector according to claim 1, wherein the first conductive strip is printed on the substrate plate, the second conductive strip being printed on the insulating strip.

3. Detector according to claim 1, wherein the connection means of the first and last electrodes, the substrate and polarization plates and the first and second conductive strips comprise conductive tracks printed on the substrate plate linked respectively to said first and last electrodes and to the first and second conductive strips, wherein said substrate slate and said first and second conductive strips traverse at least one opening of the first rear face of the chamber by an output connection secured around the substrate plate and the conductive tracks and secured to the first rear face of the chamber, said conductive tracks being respectively linked outside the chamber to said measurement and power supply means and to the reference potential.

4. Detector according to claim 3, wherein said output connection comprises an adaptor sleeve comprising a passage opening and a substrate which are secured inside the passage opening by a sealing and insulating glue, the adaptor sleeve being engaged to an opening of the first rear face of the chamber and comprising a shoulder fitted with fixing means on the first rear face of the chamber, a seal joint being inserted between the shoulder and the first rear face of the chamber.

5. Detector according to claim 2, wherein the first and second conductive strips are in contact with each other.

6. Detector according to claim 2, wherein the first and second conductive strips are interlinked.

* * * * *